Sept. 26, 1961 C. J. HIRSCH 3,002,090

AUTOMATIC-GAIN-CONTROL SYSTEM

Filed Aug. 27, 1958 4 Sheets-Sheet 1

Sept. 26, 1961 C. J. HIRSCH 3,002,090

AUTOMATIC-GAIN-CONTROL SYSTEM

Filed Aug. 27, 1958 4 Sheets-Sheet 2

United States Patent Office 3,002,090

Patented Sept. 26, 1961

3,002,090

AUTOMATIC-GAIN-CONTROL SYSTEM

Charles J. Hirsch, Locust Valley, N.Y., assignor to Hazeltine Research, Inc., Chicago, Ill., a corporation of Illinois Filed Aug. 27, 1958, Ser. No. 757,633
11 Claims. (Cl. 250—20)

This invention pertains to wave-signal receivers, and particularly to improved automatic-gain-control systems for such receivers.

Television receivers and all but the least expensive radio receivers include automatic-gain-control systems for maintaining the amplitude of the detected signal substantially independent of variations in the strength of the received modulated wave signal. In this way, fluctuations in receiver output when the tuning is changed from one station to another or due to fading in and out of a received signal are minimized. Such automatic-gain-control systems, known more concisely as "A.G.C." systems, operate by developing a control voltage having a magnitude dependent on the received signal strength. This voltage is then applied to one or more of the radio-frequency and intermediate-frequency amplifiers to cause the signal amplifications they achieve to vary substantially inversely with respect to variations in signal strength. A strong signal thus receives commensurately less amplification than a weak signal, and the net amplified signal is maintained more nearly constant.

A major problem in operation of conventional A.G.C. systems is that during reception of weak signals the A.G.C. voltage is comparatively small. A strong burst of interfering wave signals is, therefore, capable of producing grid current in a controlled vacuum tube amplifier or base current in a controlled transistor amplifier. This current will charge the filter capacitor located in the grid or base return path, and since that path has a long time constant the charge will take a considerable time to leak off. The decaying voltage so produced across the filter capacitor can then modulate the desired incoming signal to produce interference at the signal frequency. If the interfering bursts recur fairly often, an average charge may be developed which can actually influence the automatic-gain-control system to cause a reduction of the gain of the controlled amplifier for the incoming signal.

Accordingly, a principal object of the invention is to provide an improved automatic-gain-control system for signal receivers.

A further object is to provide an automatic-gain-control system of greatly reduced susceptibility to interfering signals.

In accordance with the invention, an automatic-gain-control system for a wave-signal receiver comprises transistor amplifying means having an input terminal, an output terminal, and a common terminal. It also comprises means for applying a received signal between the input terminal of the amplifying means and a point of signal reference potential to cause the amplifying means to produce an amplified signal between its output terminal and the point of signal reference potential, the signal gain of the amplifying means being variable in response to variations in the signal potential between its input and common terminals. Detecting means are coupled to the output terminal of the amplifying means for deriving a control voltage dependent on the strength of the amplified signal. The system also comprises transistor control means having an input terminal coupled to the detecting means to receive the control voltage and having an output terminal coupled to the common terminal of the amplifying means, the control means being of opposite type conductivity with respect to the amplifying means and responsive to the control voltage to control the proportion of the received signal applied between the input and common terminals of the amplifying means relative to the proportion of the received signal applied between the common terminal and the point of signal reference potential whereby the over-all system gain is controlled to compensate for variation of the received signal strength from a preselected level.

A more complete description of the invention is presented in the following specification and accompanying drawings, in which.

Figures 2, 2A:
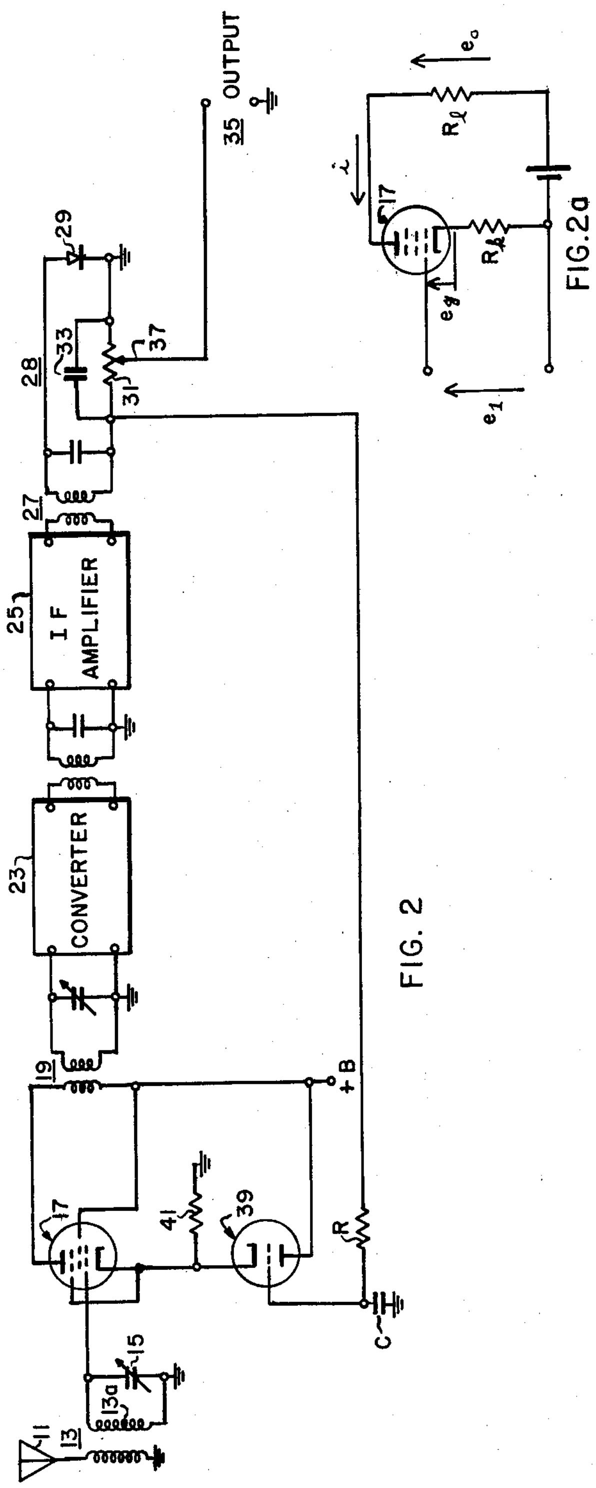
FIG. 2 is a circuit diagram of an A.G.C. system constructed in accordance with applicant's invention as embodied in a signal receiver employing vacuum tube amplifiers.
Figure 3:
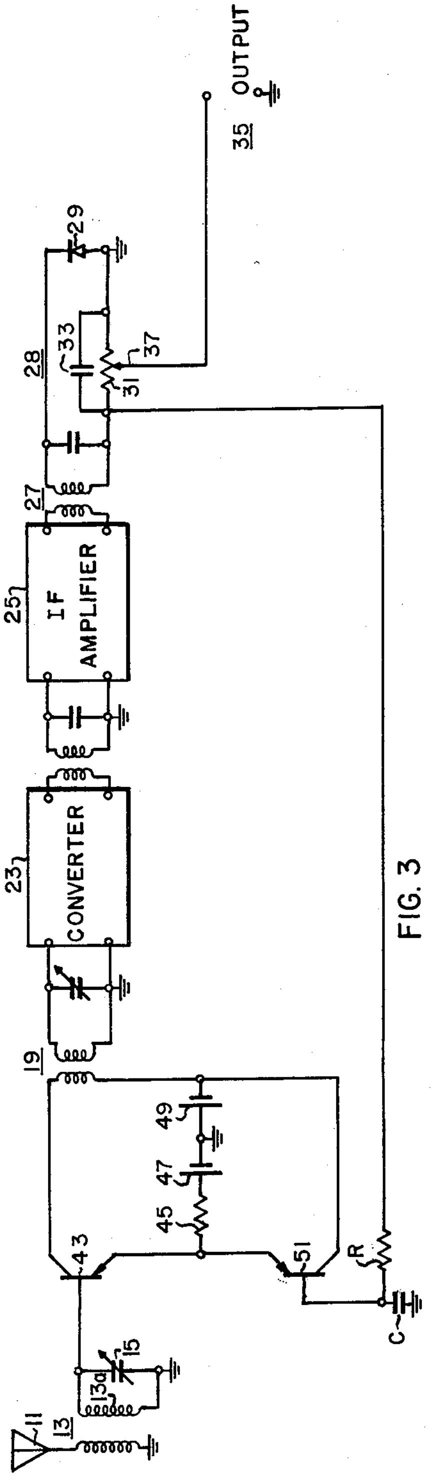
Figure 4:
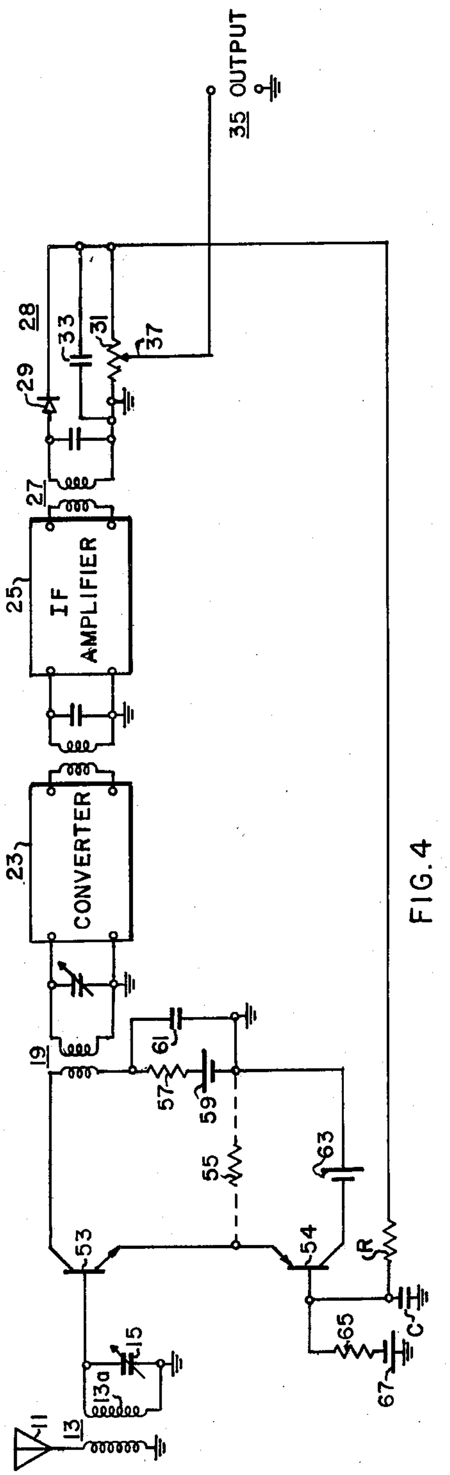
Figure 5:
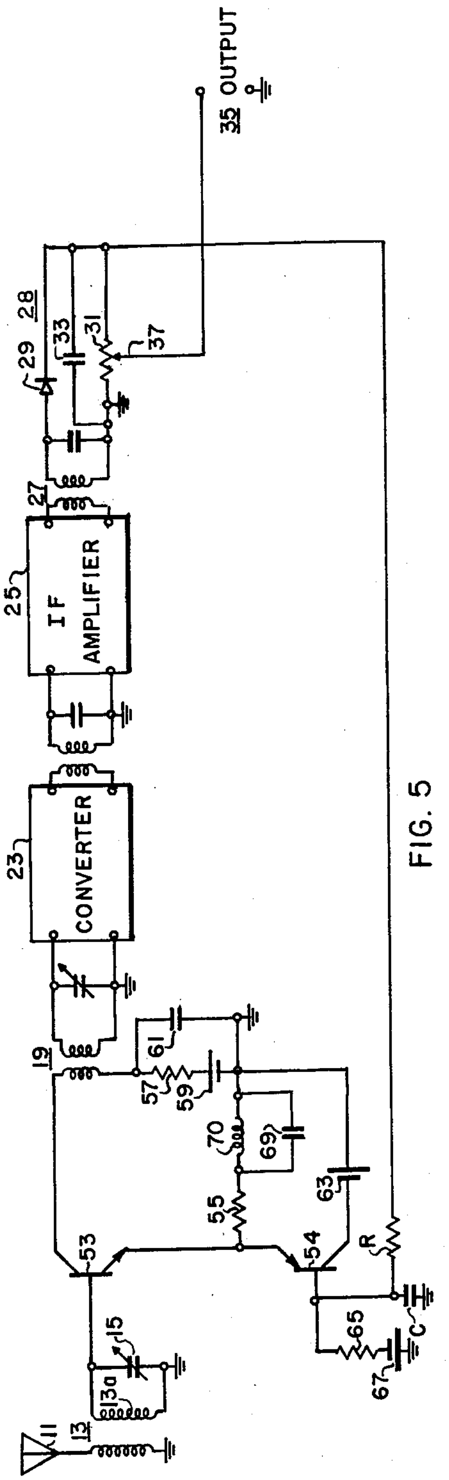
Figure 6:
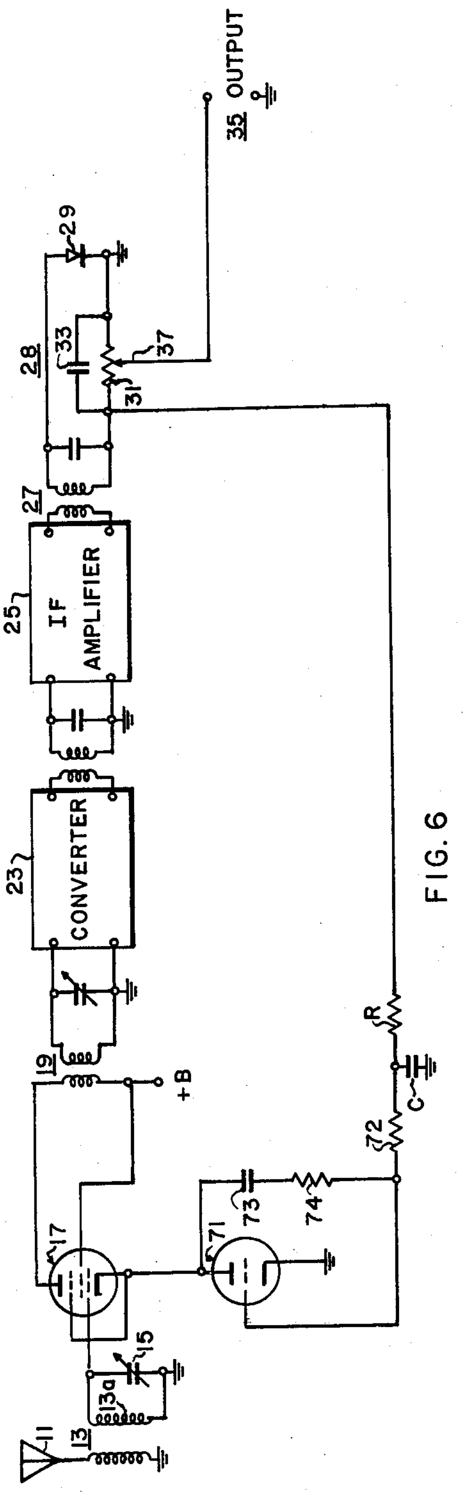
Figure 7:
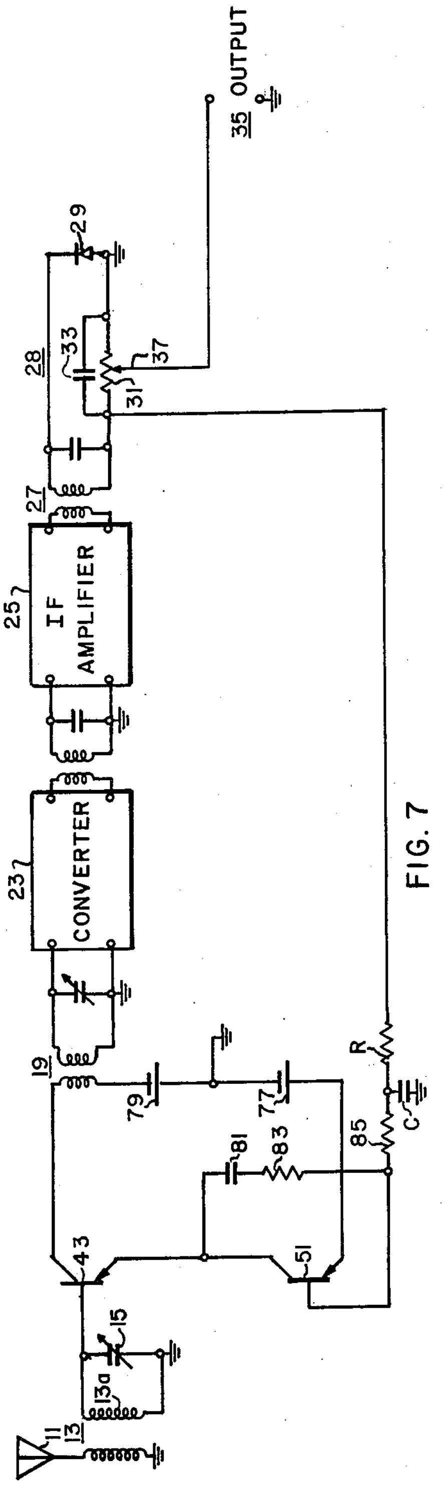
Figure 8:
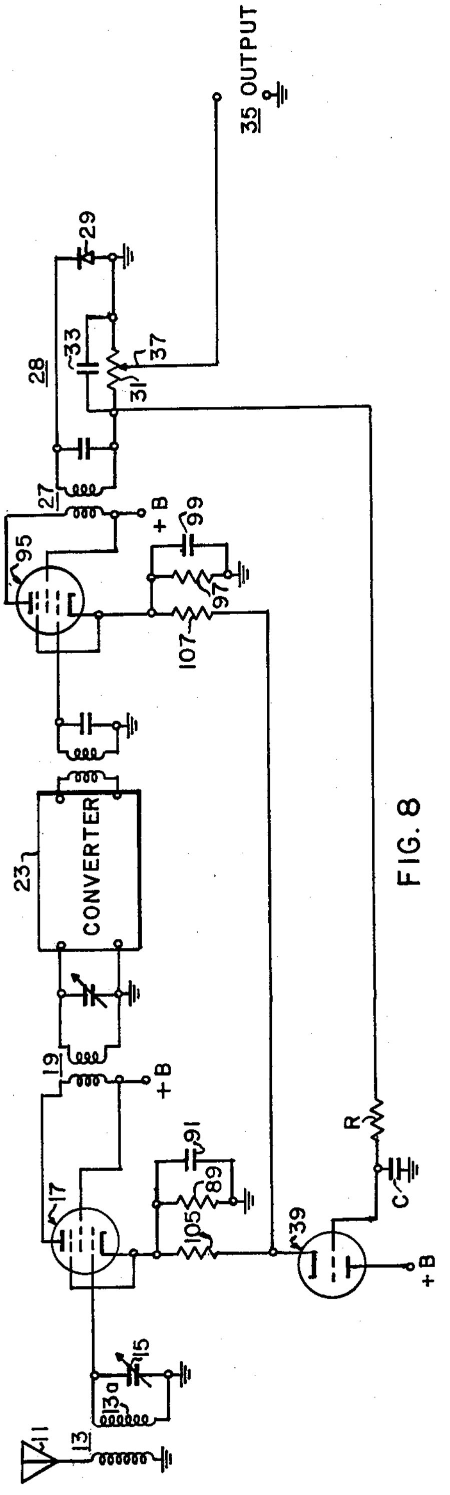

FIG. 2*a* is a schematic equivalent of a portion of the circuit of FIG. 2 for the purpose of analyzing the gain control operation thereof;

FIG. 3 is a circuit diagram of an embodiment of the invention applicable to signal receivers employing transistor amplifiers;

FIG. 4 is a circuit drawing of another embodiment of the invention applicable to signal receivers employing transistor amplifiers;

FIG. 5 is a circuit drawing of another embodiment of the invention involving a modification of the circuit of FIG. 4;

FIG. 6 is a circuit drawing of a modification of the the vacuum tube circuit of FIG. 2 wherein a different type of control circuit is employed to achieve operation in accordance with the invention;

FIG. 7 is a circuit drawing of a similar modification of the transistor circuit of FIG. 3, and FIG. 8 is a circuit drawing of an embodiment of the invention wherein the requisite automatic gain control is achieved by adjusting only the direct potential at the common terminal of the controlled stage.

*Prior art*

Figure 1:
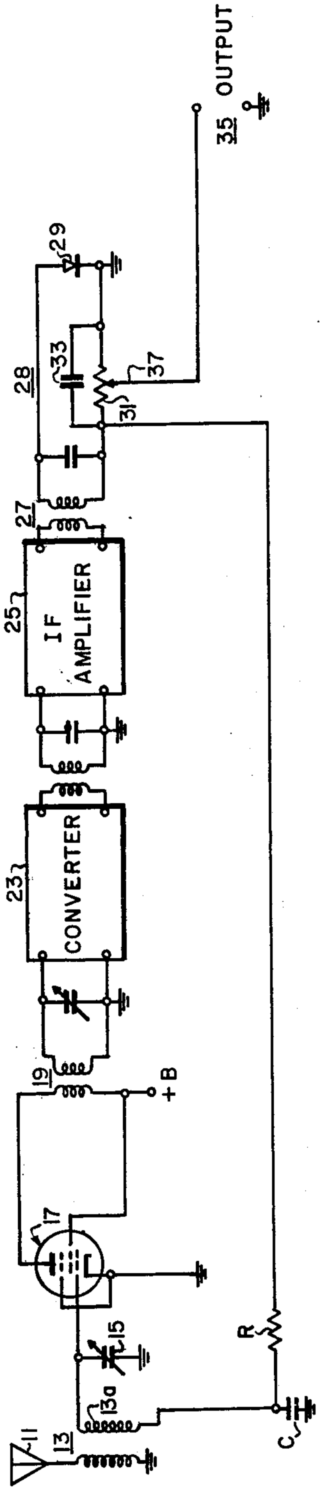
FIG. 1 (PRIOR ART)
FIG. 1 is a circuit drawing of a conventional signal receiver employing an automatic-gain-control system in accordance with the prior art.

Referring to FIG. 1, which is typical of prior art signal receivers, a modulated radio-frequency carrier wave signal received by antenna 11 produces a radio frequency (R.F.) signal voltage across the primary winding of a radio-frequency transformer 13 which is tuned to the frequency of the desired signal by means of variable capacitor 15 connected across the transformer secondary winding **13*a*. One terminal of winding 13*a* is connected to the grid of a vacuum tube pentode 17 serving as a radio-frequency amplifier. The resultant amplified signal at the anode of pentode 17 is applied via another tuned radio-frequency transformer 19 to a converter 23 which shifts it to a predetermined fixed intermediate frequency (I.F.). The resultant I.F. signal voltage is then passed through one or more successive fixed tuned cascaded I.F. amplifier stages designated in block 25, and is finally applied via a tuned I.F. transformer 27 to a detector circuit 28. The latter produces a detected signal voltage comprising a component corresponding to the modulating component of the received signal, and a direct component corresponding to the amplitude of the carrier component of the received signal. If the received signal is frequency modulated, detector 28 would be either a discriminator or a ratio detector. If the received signal is amplitude modulated, detector 28 may simply comprise a diode 29 in series with a load resistor 31 shunted by a capacitor 33. Since both types as well known, in the interest of simplicity amplitude modulation will be assumed. The detected voltage, which will then appear across load resistor 31, is conveyed to the pair of output terminals 35**. When applied to a suitable audio or visual transducer, depending on whether the receiver is for radio or television signals, this voltage will reproduce the transmitted intelligence represented by the modulating component of the received signal.

An A.G.C. voltage is developed at the left-hand terminal of resistor 31 by grounding the right-hand terminal thereof connected to the cathode of diode 29. This voltage is the direct component of the detected voltage produced across resistor 31, and becomes more negative relative to ground as the received signal increases in strength. If that voltage is applied to the grid of R.F. amplifier pentode 17, the consequent reduction in its signal gain with increased negative grid bias voltage will serve to compensate for variations in received signal strength. That is, a degenerative feedback loop will be established which will provide the A.G.C. behavior previously described. However, since the detected voltage includes the modulating component of the received signal as well as a direct component proportional to the signal carrier strength, in order to prevent degeneration of the modulating component it is necessary to separate the direct component prior to its utilization as the A.G.C. voltage. Accordingly, a modulating frequency filter comprising a resistor R which is shunted to ground by a capacitor C is connected to the left-hand terminal of resistor 31. The filtered A.G.C. voltage, appearing across capacitor C, is applied to the lower terminal of secondary winding 13*a* of transformer 13 and is conducted by that winding to the grid of pentode 17.

A major deficiency of this A.G.C. system may be perceived by assuming that the received signal becomes quite weak. This will result in the negative A.G.C. voltage at the grid of pentode 17 becoming very small. A sudden burst of a strong interfering signal may then succeed in rendering the total voltage at the grid positive relative to ground, resulting in appreciable current flow between grid and cathode in a path from the cathode to ground, through capacitor C, and through winding 13*a*. This will develop a negative charge on capacitor C which, after the interfering signal terminates, can only dissipate in a path through resistor R and load resistor 31. The time constant of that path will be large at radio frequencies, inasmuch as the combination of R and C must filter the much lower modulating frequencies. The charge therefore dissipates quite slowly in relation to the signal frequency at the grid of pentode 17. A spurious slowly decaying negative bias voltage is thus established at that grid, resulting in modulation of the received signal and so in seriously impeding or completely preventing intelligible signal detection. If the bursts recur faster than capacitor C can discharge, an average bias will also be developed which may so reduce the gain of pentode 17 as to preclude signal detection altogether.

While the circuit of FIG. 1 has been depicted and described with a vacuum tube pentode 17 as the R.F. amplifier, the same description will apply if a transistor R.F. amplifier is employed. That is, assuming the transistor to be connected with its emitter as the common terminal between its input and output, the sharp increase in base current produced by an interfering signal burst when the desired signal is weak will charge filter capacitor C in the same manner as described.

*FIG. 2*

In contrast to the foregoing prior art A.G.C. system, instead of using the developed A.G.C. control voltage to apply a bias between the input terminals of a controlled amplifier it is utilized to adjust the signal potential at the common terminal of each such stage. In the case of vacuum tube amplifiers this terminal will be the cathode, while for transistor amplifiers it will usually be the emitter. In accordance with one aspect of the invention, the signal potential at such a common terminal is adjusted to compensate for changes in received signal strength. This is accomplished by varying the effective signal impedance or resistance between the common and input terminals of the controlled stage to establish the proper amount of signal degneration. However, the invention also envisions adjusting only the direct-current potential at the common terminal of a controlled stage to control the gain thereof without degeneration of the received signal. Such potential adjustment is produced, in each case, by circuit means connected to the final detector of the receiver for receiving the A.G.C. voltage and for deriving either a direct potential or a signal potential dependent on the magnitude of the control voltage. This potential is applied to the common terminal of the stage being controlled to adjust the signal amplification therein in accordance with changes in received signal strength.

The circuit of FIG. 2 is an embodiment of the invention of the first type described above. That is, A.G.C. operation is obtained by controlling the signal potential at the common terminal of the controlled stage. The signal receiver circuit therein is generally of the same type as that of FIG. 1, corresponding elements being identified with the same reference numerals. In FIG. 2, however, the lower terminal of secondary winding 13*a* of radio-frequency transformer 13 is grounded, and the common terminal or cathode of pentode amplifier 17 is connected to the output terminal of potential control means such as vacuum tube triode 39, the output terminal thereof in this case also being the cathode. Both cathodes are connected to ground by a resistor 41. The screen grid and anode of pentode 17 and the anode of triode 39 are connected to the positive terminal of a direct-voltage supply, and the grid of triode 39 is connected to the junction of capacitor C and resistor R to receive the filtered A.G.C. voltage from detector 28.

The cathode circuit of triode 39 serves as a controlled resistance in parallel with resistor 41 for varying the total effective resistance to ground at the cathode of pentode 17. The resistance presented by the cathode of triode 39 is very nearly equal to $$\frac{1}{g_{m2}}$$

where $g_{m2}$ is the mutual conductance of that tube. Accordingly, so long as the resistance of resistor 41 is appreciably higher than the value $$\frac{1}{g_{m2}}$$

its effect on the total cathode resistance will be negligible. The value of $g_{m2}$ is dependent on the negative A.G.C. control voltage at the grid of triode 39, and increases as the magnitude of that voltage decreases. Consequently, $g_{m2}$ is high for weak signals and low for very strong signals. A typical range of variation is from about $6000\times10^{-6}$ mhos to zero mhos, so that $$\frac{1}{g_m}$$

will vary from about 167 ohms to an open-circuit condition. The effect of this variation on the net circuit gain of the controlled amplifier stage may be calculated by analysis of the equivalent circuit of pentode 17 as shown in FIG. 2*a*, wherein the effective resistance connected at the cathode is denoted $R_k$. It is clear from that circuit that the signal voltage actually amplified by pentode 17 is the net voltage $e_g$ between the grid and cathode. This net signal voltage is the difference between the received signal voltage $e_1$ and the potential developed at the output terminal or cathode of triode 39 and so at the common terminal or cathode of pentode 17. This potential is equal to the voltage drop $iR_k$ produced by the anode current $i$ of pentode 17 flowing through resistor $R_k$. That is, $$e_g=e_1-iR_k \qquad (1)$$

If the signal gain of pentode 17 is $\mu$, which is equal to the product of the transconductance gain factor $g_{m1}$ and small degree, its anode current increasing by an amount somewhat less than the reduction of the anode current of triode 39. The result is a small increase in the transconductance gain factor of pentode 17, and so in a tendency for the signal amplification to rise. However, this is more than compensated by the increased signal potential at the cathode of pentode 17 due to the increased effective cathode resistance. Consequently, the only effect of the slight change in bias of pentode 17 due to the A.G.C. operation is to decrease somewhat the rate at which the signal amplification drops as the received signal strength increases.

It should be particularly noted that the circuit of FIG. 2 avoids the susceptibility to interference which is characteristic of prior A.G.C. systems. This is because A.G.C. filter capacitor C is isolated by triode 39 from the path of grid current which an interefring signal burst might produce in pentode 17 when the desired received signal is at a low level. No spurious charge can, therefore, be developed by the capacitor as a result of such interference. In addition, the very small effective impedance in the grid current return path in this operating condition will preclude charging of any other or stray capacitances which might be present.

*FIG. 3*

The circuit of FIG. 3 discloses an embodiment of the invention similar to that of FIG. 2, but is applied to a signal receiver employing transistors in lieu of vacuum tubes. Corresponding elements of both circuits have been similarly identified. In FIG. 3 the ungrounded terminal of secondary winding 13*a* of tuned radio-frequency transformer 13 is connected to the input terminal, in this case the base, of a transistor 43 serving as a radio-frequency amplifier, the common terminal or emitter of transistor 43 being connected by a resistor 45 to the positive terminal of a biasing battery 47 which is grounded at its negative terminal. The output terminal or collector of transistor 43 is connected by the primary winding of tuned radio-frequency transformer 19 to the negative terminal of another biasing battery 49 which is grounded at its positive terminal. It is assumed that transistor 43 is either a PNP junction transistor or type N point contact transistor, as indicated in accordance with convention by the direction of the arrow on its emitter. Of course, an NPN junction transistor or a type P contact transistor could equally well be employed simply by reversing the indicated battery polarities. The emitter of transistor 43 is further connected to the output terminal, in this case the emitter, of potential control means in the form of a second transistor 51, the collector of the latter being connected to the negative terminal of battery 49. The input terminal, in this case the base, of transistor 51 is connected to the junction of resistor R and capacitor C to receive the filtered A.G.C. voltage from detector 28. While transistor 51 is here of the same type conductivity as transistor 43, this requirement is not essential to the invention. Circuits wherein both transistors are of the same type are described hereinafter. The remaining modification of the circuit of FIG. 3 relative to that of FIG. 2 is inversion of the polarity of connection of diode 29 in detector 28 so that its anode is grounded instead of the cathode.

Transistor 43 serves as a common emitter radio-frequency amplifier for received signals applied to its base by winding 13*a*, while transistor 51 serves to control the signal potential at the emitter of transistor 43 in accordance with the strength of the received signal. Due to the polarity of connection of diode 29, an increase in received signal strength increases the positive A.G.C. voltage applied to the base transistor 51, thereby reducing its conductivity. Similar to the foregoing description of the behavior of triode 39 in the circuit of FIG. 2, the effective emitter resistance of transistor 51 then increases in accordance with the reciprocal of the decreased value of the transistor transconductance gain factor $g_m$. This factor varies with base voltage in a manner similar to the variation of the corresponding factor for a vacuum tube in response to changes in grid bias, the only difference being that $g_m$ for a transistor is higher than for a vacuum tube. The total effective resistance at the emitter of transistor 43 thereby increases as the received signal strength increases, resulting in an emitter signal potential which is a larger fraction of the received signal. The net amplified signal at the collector is thus effectively stabilized.

*FIG. 4*

As pointed out above, the operation of the circuit of FIG. 2 entails some increase in the gain of controlled pentode 17 as the received signal increases. Similarly, in FIG. 3 an increase in received signal strength produces a more positive A.G.C. voltage at the base of transistor 51 which reduces its emitter current. This increases the emitter current of controlled transistor 43 to some extent, thereby increasing its signal gain. In each case, the increase in gain of the controlled amplifier offsets to some extent the opposite effect of the A.G.C. circuit operation. Of course, since the change in the effective cathode resistance of pentode 17 in FIG. 2 or in the effective emitter resistance of transistor 43 in FIG. 3 has a much greater effect on net signal amplification this offsetting action is of only secondary importance. However, by using controlled and controlling transistors of opposite type, as in the circuit of FIG. 4, it may be eliminated or actually used to assist in the A.G.C. operation.

The circuit of FIG. 4 is generally similar to that of FIG. 2, corresponding elements being similarly designated. However, here the controlled amplifier is a transistor 53 of the NPN junction or type P point contact type, and the potential control means is a transistor 54 of the PNP junction or type N point contact type. The input terminal or base of transistor 53 is connected to secondary winding 13*a* of tuned radio-frequency transformer 13, the common terminal or emitter thereof being connected to the output terminal or emitter of transistor 54. Both emitters are connected to ground by a resistor 55. The output terminal or collector of transistor 53 is connected by the primary winding of tuned radio-frequency transformer 19 and a resistor 57 in series to the positive terminal of a battery 59 which is grounded at its negative terminal. Battery 59 and resistor 57 serve to properly bias transistor 53, and are by-passed for radio-frequency signals by a capacitor 61. The collector of transistor 54 is connected to the negative terminal of a battery 63 which is grounded at its positive terminal, the base being connected by a resistor 65 to the negative terminal of another battery 67 having its positive terminal at ground. The base of transistor 54 is also connected via the usual A.G.C. filter to the cathode of diode 29 in detector 28, the ground connection in detector 28 here being at the terminal of resistor 31 therein opposite that connected to the cathode of diode 29. In this way, battery 67 not only serves to properly bias transistor 54, but additionally assists the conduction of diode 29.

The emitter current of transistor 54 flows through resistor 55 in a direction from right to left, while the emitter current of transistor 53 flows through that resistor in a direction from left to right. The net current in resistor 55 is therefore usually very small, most of the current from the emitter of transistor 53 flowing into the emitter of transistor 54. Consequently, an increase in the positive A.G.C. voltage at the base of transistor 54, such as occurs when the received signal strength increases, tends not only to reduce the emitter current of transistor 54 but also the emitter current of transistor 53. A reduction in gain of the latter is thereby internal anode resistance $R_p$ of pentode 17, the usual amplifier equation gives:

$$\mu e_g = \mu(e_1 - iR_k) = i(R_p + R_l + R_k) \qquad (2)$$

where $R_l$ represents the load resistance connected to the anode. Equation 2 can be solved for anode current $i$, giving $$i = \frac{e_1}{\left(\frac{R_p + R_l}{\mu} + \frac{(\mu+1)}{\mu} R_k\right)} \qquad (3)$$

In any practical amplifier of this type $R_p \gg R_l$, and also $$\frac{\mu+1}{\mu} \approx 1$$

Equation 3, therefore, reduces to:

$$i = \frac{e_1}{\frac{R_p}{\mu} + R_k} = \frac{g_{m1} e_1}{1 + g_{m1} R_k} \qquad (4)$$

If the amplified signal at the anode is denoted $e_0$, the net signal amplification will be:

$$A = \frac{e_0}{e_1} = \frac{iR_l}{e_1} = \frac{g_{m1} R_l}{(1 + g_{m1} R_k)} \qquad (5)$$

As described previously, during reception of weak signals the cathode resistance of triode 39 will be small. Assuming that its transconductance gain factor then has the typical value given above of $6000 \times 10^{-6}$ mhos, its cathode resistance will be the reciprocal of that value or about 167 ohms. If resistor 41 has a resistance about twenty times greater, or 3200 ohms, the net effective cathode resistance $R_k$ of pentode 17 will very closely be 167 ohms. In addition, if it is supposed that pentode 17 also has a transconductance gain factor $g_{m1}$ of $6000 \times 10^{-6}$ mhos, the net signal amplification given by Equation 5 becomes:

$$A = \frac{1}{2} g_{m1} R_l \qquad (6)$$

During reception of strong signals the transconductance gain factor of triode 39 will be very nearly zero, making its cathode resistance very high. The value of $R_k$ will then be the resistance of resistor 41, or 3200 ohms. The net signal gain given by Equation 5 for this operating condition is $$A = \frac{1}{20} g_{m1} R_l \qquad (7)$$

Comparison of Equations 6 and 7 shows that the signal amplification is controlled over a range of 10:1 between the weak and strong signal conditions.

The signal potential at the cathode of pentode 17, which may be denoted $e_k$, is $$e_k = iR_k \qquad (8)$$

Substituting the value of $i$ from Equation 4 into Equation 8, $$e_k = \frac{e_1 g_{m1} R_k}{1 + g_{m1} R_k} \qquad (9)$$

It is clear from Equation 9 that the cathode signal potential $e_k$ is a fraction of the received signal $e_1$. In addition, from Equation 1 above, it is seen that it opposes and subtracts from the received signal voltage $e_1$ to result in the smaller net voltage $(e_1 - e_k)$ which is actually amplified by pentode 17. Combining Equations 1 and 9, this net voltage may be expressed as $$e_1 - e_k = e_1 - \frac{e_1 g_{m1} R_k}{1 + g_{m1} R_k}$$

or $$e_1 - e_k = \frac{e_1}{1 + g_{m1} R_k}$$

or $$\frac{e_1 - e_k}{e_1} = \frac{1}{1 + g_{m1} R_k} \qquad (10)$$

The bias of pentode 17 remains fairly constant at all signal strengths, changing only because of a secondary effect described hereinafter. The value of its transconductance gain factor $g_{m1}$ may, therefore, be considered to remain approximately constant. As stated, this may be about $6000 \times 10^{-6}$ mhos. Assuming, as before, that $R_k$ is 167 ohms during reception of weak signals, substitution of these values in Equation 10 leads to the result, $$\frac{e_1 - e_k}{e_1} = \frac{1}{2} \qquad (11)$$

During strong signal reception the value of $R_k$ rises to the resistance of resistor 41, or about 3200 ohms. The ratio given by Equation 10 then becomes $$\frac{e_1 - e_k}{e_1} = \frac{1}{20} \qquad (12)$$

Equations 11 and 12 show that when the received signal is weak a comparatively large fraction (½) of it is amplified by pentode 17. However, during reception of a strong signal a much smaller fraction ($\frac{1}{20}$) of it is actually amplified, the greatest portion thereof being opposed by a correspondingly large signal potential $e_k$ produced at the output terminal of the potential control means connected to the common terminal or cathode of pentode 17. This reduction in the portion of the received signal which is actually amplified as the signal strength increases also has the effect of reducing the susceptibility of the receiver to interference and cross talk.

The foregoing analysis of the manner in which automatic gain control is effected in the embodiment of the invention shown in FIG. 2 shows that the system is a novel arrangement for establishing a negative or degenerative feedback loop. That is, detector 28 may be likened to an error detector which derives a detected voltage dependent on the amplitude of the carrier component of the amplified signal and compares it with the bias voltage already at the input terminal or grid of controlling triode 39. When a change in received signal strength changes the existing difference between those voltages, a corrective control voltage change is applied by the detector to the grid of triode 39. The latter then serves as a controller responsive to the error voltage to change the signal amplification produced by pentode 17 so as to reduce that error to zero. Of course, some change in the A.G.C. voltage at the grid of 39 as a result of a change in signal strength must occur in order to initiate the corrective operation, so that some variation of the amplified and detected signals occurs. However, the proportionate variation thereof will be far less than that of the received signal, and, in any event, may be reduced to any desired degree by providing amplification in the feedback path.

No mention has thus far been made of the bias arrangement in FIG. 2. Pentode 17 and triode 39 both pass their plate currents through cathode resistor 41, thus providing a direct grid-cathode bias for each of those tubes. The bias of triode 39 is further dependent on the A.G.C. voltage applied to its grid, which will be zero when the received signal is very weak. The biases for both tubes may therefore be controlled by adjusting the direct supply voltage applied to their anodes and to the screen grid of pentode 17 until the pentode bias results in an adequate transconductance gain factor for a preselected received signal strength. Ordinarily, this will mean adjusting the supply voltage for a maximum transconductance gain factor of pentode 17 in the absence of a received signal. When the signal increases from the level so selected, the increasingly negative A.G.C. voltage at the gird of triode 39 decreases its anode current and so also reduces the total current through resistor 41 to some extent. The bias of pentode 17 thereby drops to a effected concurrent with the increase in the resistance at its emitter by virtue of the increased value of $$\frac{1}{g_m}$$

of transistor 54. Very sensitive A.G.C. operation is thereby achieved.

Since the emitter currents of transistors 54 and 53 are in opposition in resistor 55, it is possible to operate with that resistor omitted from the circuit. This is indicated in FIG. 4 by the dotted connecting leads to resistor 55. However, it must be recognized that at high received signal levels the large A.G.C voltage which is produced may cause transistor 54 to approach cutoff, in which case its emitter current may become inadequate to support the emitter current of transistor 53. The entire receiver would then also cut off. Care must therefore be exercised to establish the emitter bias current of transistor 54 so that it remains conductive over the entire range of signal strengths of interest. Specific values of the circuit elements and supply voltages of a sucessfully operative A.G.C. system constructed in accordance with FIG. 4 but with resistor 55 omitted are as follows:

| | |
|---|---|
| Signal, amplitude modulated; I.F. | 455 kc. |
| Transistors: | |
| **53**; NPN junction transistor | Type 500. |
| **54**; PNP junction transistor | Type 2N4–04. |
| Diode **29** | Type 1N34A. |
| Batteries | 6 volts each. |

RESISTORS

| Item: | Ohms |
|---|---|
| R | 10,000 |
| **31** | 2,500 |
| **57** | 1,000 |
| **65** | 20,000 |

CAPACITORS

| Item: | Microfarads |
|---|---|
| C | 10 |
| **33** | 0.01 |
| **61** | 0.01 |

*FIG. 5*

The circuit of FIG. 5 is similar to that of FIG. 4, but additionally includes means for compensatiang for the emitter-to-collector capacitance of transistor 54 so as to greatly increase the impedance to ground of the emitters of transistors 53 and 54 at the signal frequencies of interest. This makes variations in the value of the transconductance gain factor $g_m$ of transistor 54 more effective in controlling the effective signal impedance at the emitter of transistor 53, and so in more sensitive A.G.C. operation. Corresponding elements of FIGS. 4 and 5 have been similarly identified. The modification in FIG. 5 consists of the addition of a parallel resonant circuit comprising capacitor 69 and and inductor 70, this circuit being connected in series with emitter resistor 55. The resultant combination shunts the emitter-to-collector capacitance of transistor 54, and so may be adjusted to render the net emitter impedance to ground, including that capacitance, parallel resonant at a frequency within the range over which the signal receiver is to be used. An extremely high emitter impedance may thus be established at the selected frequency, and will remain high compared to the value $$\frac{1}{g_m}$$

of transistor 54 even at high received signal strengths. This arrangement may be made even more efficient by tracking capacitor 69 with the tuning capacitor of radio-frequency transformer 13 to maintain the condition of maximum resonance at all received signal frequencies. However, this condition may be more simply achieved by controlling the I.F. amplifiers 25 instead of the variably tuned radio-frequency amplifier 53. In that case, since the I.F. amplifiers operate at a fixed frequency, a single value of capacitor 69 will maintain resonance for all received signals.

*FIGS 6 and 7*

The foregoing embodiments of the invention control the signal potential at the common terminal of a controlled amplifier stage by means of a variation in the resistance established at that terminal. However, since the invention is broadly directed to controlling that potential as described rather than to specific circuit arrangements for accomplishing such control a variety of other circuits may be employed. FIGS. 6 and 7 are illustrative of such other alternatives.

The circuit of FIG. 6 is generally similar to that of FIG. 2, corresponding elements being similarly designated. Here, however, the common terminal or cathode of radio-frequency amplifier pentode 17 is connected to the output terminal of anode of potential control means here in the form of a triode 71. The cathode of triode 71 is ground, and its input terminal or grid is connected via a resistor 72 to the junction of resistor R and capacitor C to receive the filtered A.G.C. voltage. With nothing more, this would establish the effective cathode resistance to ground of pentode 17 equal to the internal anode resistance of triode 71, which is usually extremely large even at low signal levels. However, a blocking capacitor 73 and resistor 74 are connected in series between the anode and grid of triode 71. This results in signal feed-back in triode 71 which reduces its anode resistance, thus limiting the maximum total signal resistance at the cathode of pentode 17 to an acceptable value. Resistor 72 is included to isolate resistor 74 from ground with respect to signal operation.

The negative A.G.C. voltage supplied to the grid of triode 71 by detector 28 causes the anode resistance thereof to increase as the received signal strength increases. The signal potential at the cathode of pentode 17 thus also increases, reducing the net signal amplification in a manner closely analogous to the reduction thereof effected by the circuit of FIG. 2 with increasing signal strength.

The circuit of FIG. 7 is the transistor equivalent of that shown in FIG. 6, and is generally similar to the transistor circuit of FIG. 3. Corresponding elements of FIGS. 7 and 3 have been similarly identified. However, in FIG. 7 the emitter of transistor 43 is connected to the collector of transistor 51, the latter electrode being connected to its associated base electrode by a blocking capacitor 81 and resistor 83 in series. The base of transistor 51 is connected by isolating resistor 85 to the junction of A.G.C. filter resistor R and capacitor C. As in the case of resistors 72 and 74 in FIG. 6, resistors 83 and 85 serve to hold the maximum signal resistance to ground at the emitter of transistor 43 within an acceptable range. In this circuit the collector resistance of transistor 51 controls the resistance to ground at the emitter of transistor 43. As the received signal increases, the A.G.C. voltage at the base of transistor 51 become more positive. The collector resistance thereby increases, increasing the signal potential at the emitter of transistor 43, and so reducing the signal amplification as in the above description of the circuit of FIG. 3.

*FIG. 8*

FIG. 8 illustrates an embodiment of the invention wherein automatic gain control is achieved by controlling the direct potential at the common terminal of the controlled amplifier stage without affecting the signal potential at that terminal. That is, this circuit does not employ signal degeneration to achieve the requisite gain control. The conventional portions of this circuit are similar to those portions of FIG. 2, corresponding elements therein being similarly designated. Here, however, the amplified I.F. signal voltage at the output of converter 23 is amplified by I.F. amplifier pentode 95 and coupled to a detector 28 wherein the detector diode 29 is connected to ground at its cathode. The filtered A.G.C. voltage at the junction of resistor R and capacitor C is applied to the input terminal or grid of potential control means such as a triode 39 as in FIG. 2. Here, however, the output terminal or cathode of triode 39 is connected to the common terminal or cathode of pentode 17 by a resistor 105 and to the common terminal or cathode of pentode 95 by a resistor 107. Also, the cathode of pentode 17 is connected to ground by a resistor 89 shunted by R.F. by-pass capacitor 91, and the cathode of pentode 95 is connected to ground by a resistor 97 shunted by I.F. by-pass capacitor 99. Resistors 105 and 107 are relatively small compared to resistors 89 and 97, serving to provide some isolation between the cathodes of both pentodes if it is necessary that those points be at different quiescent bias potentials and to prevent I.F. feedback between them. Such quiescent bias potentials are respectively established by resistors 89 and 97.

When the received signal strength is at a preselected level, usually chosen as zero, resistors 89 and 97 and the anode supply voltage may be adjusted so the biases of pentodes 17 and 95 establish their signal gains at required or maximum values. When the received signal strength increases the resultant more positive A.G.C. voltage renders controlling triode 39 more conductive, causing increased current through resistors 89 and 97 and so increasing the direct cathode potentials of each of pentodes 17 and 95. Their transconductance gain factors will thereby drop, thus tending to maintain the amplified signal at detector 28 substantially independent of the received signal strength.

While the invention has been described with reference to various embodiments thereof in various specific receiver circuits, those skilled in the electronics art will readily perceive many modifications and variations of these embodiments and circuits which may be constructed in accordance with the true scope and teachings of the invention as defined herein.

What is claimed is:

1. An automatic-gain-control system for a wave-signal receiver, comprising: transistor amplifying means having an input terminal, an output terminal, and a common terminal; means for applying a received signal between the input terminal of said amplifying means and a point of signal reference potential; detecting means coupled to the output terminal of said amplifying means for deriving a control voltage dependent on the strength of the amplified signal; and transistor control means having an input terminal coupled to said detecting means to receive said control voltage and having an output terminal coupled to the common terminal of said amplifying means, said control means being of opposite type conductivity with respect to said amplifying means and responsive to said control voltage to control the proportion of the received signal applied between the input and common terminals of said amplifying means relative to the proportion of said received signal applied between said common terminal and said point of signal reference potential whereby the over-all system gain is controlled to compensate for variation of the received signal strength from a preselected level.

2. An automatic-gain-control system for a wave-signal receiver, comprising: transistor amplifying means having an input terminal, an output terminal, and a common terminal; means for applying a received signal to the input terminal of said amplifying means; detecting means coupled to the output terminal of said amplifying means for deriving a control voltage dependent on the strength of the amplified signal; and transistor control means having an input terminal coupled to said detecting means to receive said control voltage and having an output terminal coupled to the common terminal of said amplifying means, said control means being of opposite type conductivity with respect to said amplifying means and responsive to said control voltage to control the proportion of the received signal applied between the input and common terminals of said amplifying means relative to the proportion of the received signal applied between said common terminal and said point of signal reference potential which establishes increasingly degenerative signal feedback between said input and common terminals as the strength of the received signal increasingly departs from a preselected level.

3. An automatic-gain-control system for a wave-signal receiver, comprising: transistor amplifying means having an input terminal, an output terminal, and a common terminal; means for applying a received signal between the input terminal of said amplifying means and a point of signal reference potential; detecting means coupled to the output terminal of said amplifying means for deriving a control voltage dependent on the strength of the amplified signal; and transistor control means having an input terminal coupled to said detecting means to receive said control voltage and having an output terminal coupled to the common terminal of said amplifying means, said control means being of opposite type conductivity with respect to said amplifying means and responsive to said control voltage to control the proportion of the received signal applied between the input and common terminals of said amplifying means relative to the proportion of said signal applied between said common terminal and said point of signal reference potential to reduce the over-all system gain as said control voltage increases from a quiescent value and to increase the over-all system gain as said control voltage decreases toward the same quiescent value, the quiescent value of said control voltage being produced by said detecting means when the received signal has a preselected strength.

4. An automatic-gain-control system for a wave-signal receiver wherein the received signals have a modulation component and a carrier component, comprising: transistor amplifying means having an input terminal, an output terminal, and a common terminal; means for applying a received signal between the input terminal of said amplifying means and a point of signal reference potential; detecting means coupled to the output terminal of said amplifying means for deriving from said amplified signal the amplified modulation component thereof and a control voltage proportional to the strength of the amplified carrier component; filtering means connected to said detecting means for translating said control voltage substantially separate from said amplified modulation component; and transistor control means having an input terminal connected to said filtering means to receive said control voltage and having an output terminal connected to the common terminal of said amplifying means, said control means being of opposite type conductivity with respect to said amplifying means and responsive to said control voltage to control the proportion of the received signal applied between the input and common terminals of said amplifying means relative to the proportion of the received signal applied between said common terminal and said point of signal reference potential whereby the over-all system gain is controlled which varies the signal gain of said amplifying means to compensate for variation of the strength of the received carrier component from a preselected level.

5. An automatic-gain-control system for a wave-signal receiver wherein the received signals have a modulation component and a carrier component, comprising: transistor amplifying means having an input terminal, an output terminal, and a common terminal; means for applying a received signal between the input terminal of said amplifying means and a point of signal reference potential; detecting means coupled to the output terminal of said amplifying means for deriving from said amplified signal the amplified modulation component thereof and a control voltage proportional to the strength of the amplified carrier component; filtering means connected to said detecting means for translating said control voltage substantially separate from said amplified modulation component; and transistor control means having an input terminal connected to said filtering means to receive said control voltage and having an output terminal connected to the common terminal of said amplifying means, said control means of opposite type conductivity with respect to said amplifying means and responsive to said control voltage to control the proportion of the received signal applied between the input and common terminals of said amplifying means relative to the proportion of the received signal applied between said common terminal and said point of signal reference potential which establishes increasingly degenerative signal feedback between said input and common terminals as the strength of the received carrier component increasingly departs from a preselected level.

6. An automatic-gain-control system for a wave-signal receiver, comprising: transistor amplifying means having an input terminal, an output terminal, and a common terminal; means for applying a received signal between the input terminal of said amplifying means and a point of signal reference potential; variable impedance means including a transistor of opposite type conductivity relative to that of said amplifying means connected between the common terminal of said amplifying means and said point of signal reference potential for establishing degenerative signal feedback between said input terminal and said common terminal; detecting means coupled to the output terminal of said amplifying means for deriving a control voltage dependent on the strength of said amplified signal; and means for applying said control voltage to said variable impedance means; said variable impedance means being adapted to increase its signal impedance when said control voltage increases from a quiescent value and to decrease its signal impedance when said control voltage decreases toward the same quiescent value, thereby increasing the degenerative signal feedback between said input and common terminals as the strength of the received signal increasingly departs from a level corresponding to the quiescent value of said control voltage.

7. An automatic-gain-control system for a wave-signal receiver wherein the received signals have a modulation component and a carrier component, comprising: transistor amplifying means having an input terminal, an output terminal, and a common terminal; means for applying a received signal between the input terminal of said amplifying means and a point of signal reference potential; variable impedance means including a transistor of opposite type conductivity relative to that of said amplifying means connected between the common terminal of said amplifying means and said point of signal reference potential for establishing degenerative signal feedback between said input terminal and said output terminal; detecting means coupled to the output terminal of said amplifying means for deriving from said amplified signal the amplified modulation component thereof and a direct control voltage proportional to the strength of the amplified carrier component; filtering means connected to said detecting means for translating said direct-control voltage substantially separate from said amplified modulation component; and means for connecting said filtering means to said variable impedance means to apply said direct-control voltage thereto; said variable impedance means being adapted to increase its signal impedance when said control voltage increases from a quiescent value and to decrease its signal impedance when said control voltage decreases toward the same quiescent value, thereby increasing the degenerative signal feedback between said input and common terminals as the strength of the received signal carrier component increasingly departs from a level corresponding to the quiescent value of said control voltage.

8. An automatic-gain-control system for a wave-signal receiver wherein the received signals have a modulation component and a carrier component, comprising: a transistor signal amplifier having an input terminal, an output terminal, and a common terminal; impedance means for connecting the common terminal of said signal amplifier to a point of reference potential; a transistor control amplifier having a control terminal and an output terminal, the output terminal thereof being connected to the common terminal of said signal amplifier; means for applying a received signal between the input terminal of said signal amplifier and said point of reference potential so the portion of said received signal between the input and common terminals thereof causes said signal amplifier to produce an amplified signal having amplified modulation and carrier components between its output terminal and said point of reference potential; detecting means coupled between the output terminal of said signal amplifier and said point of reference potential for deriving the amplified modulation component of said amplified signal and a direct-control voltage porportional to the strength of the amplified carrier component thereof; and filtering means connecting said detecting means to the control terminal of said control amplifier for conveying said direct-control voltage thereto substantially separate from said amplified modulation component; said control amplifier being of opposite type conductivity with respect to said transistor signal amplifier and adapted to establish an effective shunt resistance across said impedance means which increases the net signal impedance thereof when said control voltage increases from a quiescent value and which decreases the net signal impedance when said control voltage decreases toward the same quiescent value, the quiescent value of said control voltage being produced by said detecting means when the strength of the amplified carrier component of said amplified signal is at a preselected level, and the magnitude of said effective shunt resistance when said control voltage is at its quiescent level being smaller than the signal impedance of said impedance means for any received signal frequency.

9. An automatic-gain-control system for a wave-signal receiver wherein the received signals have a modulation component and a carrier component, comprising: a transistor signal amplifier having an input terminal, an output terminal, and a common terminal; impedance means for connecting the common terminal of said signal amplifier to a point of reference potential, the signal impedance of said impedance means being parallel-resonant at at least one of the received signal carrier component frequencies; a transistor control amplifier having a control terminal and an output terminal, the output terminal thereof being connected to the common terminal of said signal amplifier; means for applying a received signal between the input terminal of said signal amplifier and said point of reference potential to cause said signal amplifier to produce an amplified signal having amplified modulation and carrier components between its output terminal and said point of reference potential; detecting means coupled between the output terminal of said signal amplifier and said point of reference potential for deriving the amplified modulation component of said amplified signal and a direct-control voltage proportional to the strength of the amplified carrier component thereof; and filtering means connecting said detecting means to the control terminal of said control amplifier for conveying said direct-control voltage thereto substantially separate from said amplified modulation component; said control amplifier being of opposite type conductivity with respect to said signal amplifier and adapted to establish an effective shunt resistance across said impedance means which increases the net signal impedance thereof when said control voltage increases from a quiescent value and which decreases the net signal impedance when said control voltage decreases toward the same quiescent value, the quiescent value of said control voltage being produced by said detecting means when the strength of the amplified carrier component of said amplified signal is at a preselected level, and the magnitude of said effective shunt resistance when said control voltage is at its quiescent level being smaller than the impedance of said impedance means for any received signal frequency.

10. An automatic-gain-control system for a wave-signal receiver wherein the received signals have a modulation component and a carrier component, comprising: a signal amplifier which includes a first transistor having a base, a collector, and an emitter; a control amplifier which includes a second transistor of opposite type conductivity from said first transistor and having a base, a collector, and an emitter, the collector of said second transistor being connected to a point of signal reference potential; means for connecting the emitter of said first transistor to the emitter of said second transistor; means for applying a received signal between the base of said first transistor and said point of reference potential so the portion of said signal between the grid and cathode thereof causes said first transistor to produce an amplified signal having amplified modulation and carrier components between its collector and said point of reference potential; detecting means coupled between the collector of said first transistor and said point of reference potential for deriving the amplified modulation component of said amplified signal and a direct-control voltage proportional to the strength of the amplified carrier component thereof; and filtering means connecting said detecting means to the base of said second transistor for conveying said direct-control voltage thereto substantially separate from said amplified modulation component; said second transistor being responsive to said control voltage to establish a signal impedance in the input circuit of said first transistor which increases when said control voltage increases from a quiescent value and which decreases when said control voltage decreases toward the same quiescent value, the quiescent value of said control voltage being produced by said detecting means when the strength of the amplified carrier component of said amplified signal is at a preselected level.

11. An automatic-gain-control system for a wave-signal receiver wherein the received signals have a modulation component and a carrier component, comprising: a signal amplifier which includes a first transistor having a base, a collector, and an emitter; a control amplifier which includes a second transistor of opposite type conductivity having a base, a collector, and an emitter, the collector of said second transistor being connected to a point of signal reference potential; impedance means for connecting the emitters of both said transistors in common to said point of reference potential; means for applying a received signal between the base of said first transistor and said point of signal reference potential so the portion of said signal between the base and emitter thereof causes said first transistor to produce an amplified signal having amplified modulation and carrier components between its collector and said point of reference potential; detecting means coupled between the collector of said first transistor and said point of reference potential for deriving the amplified modulation component of said amplified signal and a direct-control voltage proportional to the strength of the amplified carrier component thereof; and filtering means connecting said detecting means to the base of said second transistor for conveying said direct-control voltage thereto substantially separate from said amplified modulation component; said second transistor being adapted to establish an effective shunt resistance across said impedance means which increases the net signal impedance thereof when said control voltage increases from a quiescent value and which decreases the net signal impedance when said control voltage decreases toward the same quiescent value, the quiescent value of said control voltage being produced by said detecting means when the strength of the amplified carrier component of said amplified signal is at a preselected level, and the magnitude of said effective shunt resistance when said control voltage is at its quiescent level being smaller than the impedance of said impedance means for any received signal frequency.

References Cited in the file of this patent

UNITED STATES PATENTS

| | | |
|---|---|---|
| Re. 19,857 | Franham | Feb. 18, 1936 |
| 2,041,150 | Roberts | May 19, 1936 |
| 2,069,809 | Armstrong | Feb. 9, 1937 |
| 2,128,996 | Foster | Sept. 6, 1938 |
| 2,739,189 | Koch | Mar. 20, 1956 |
| 2,773,945 | Theriault | Dec. 11, 1956 |
| 2,789,164 | Stanley | Apr. 16, 1957 |

FOREIGN PATENTS

| | | |
|---|---|---|
| 705,368 | Great Britain | Mar. 10, 1954 |